June 1, 1971  R. T. SANFEAD  3,581,404
WEDGE ORIENTATION DEVICE
Filed May 6, 1968  2 Sheets-Sheet 1

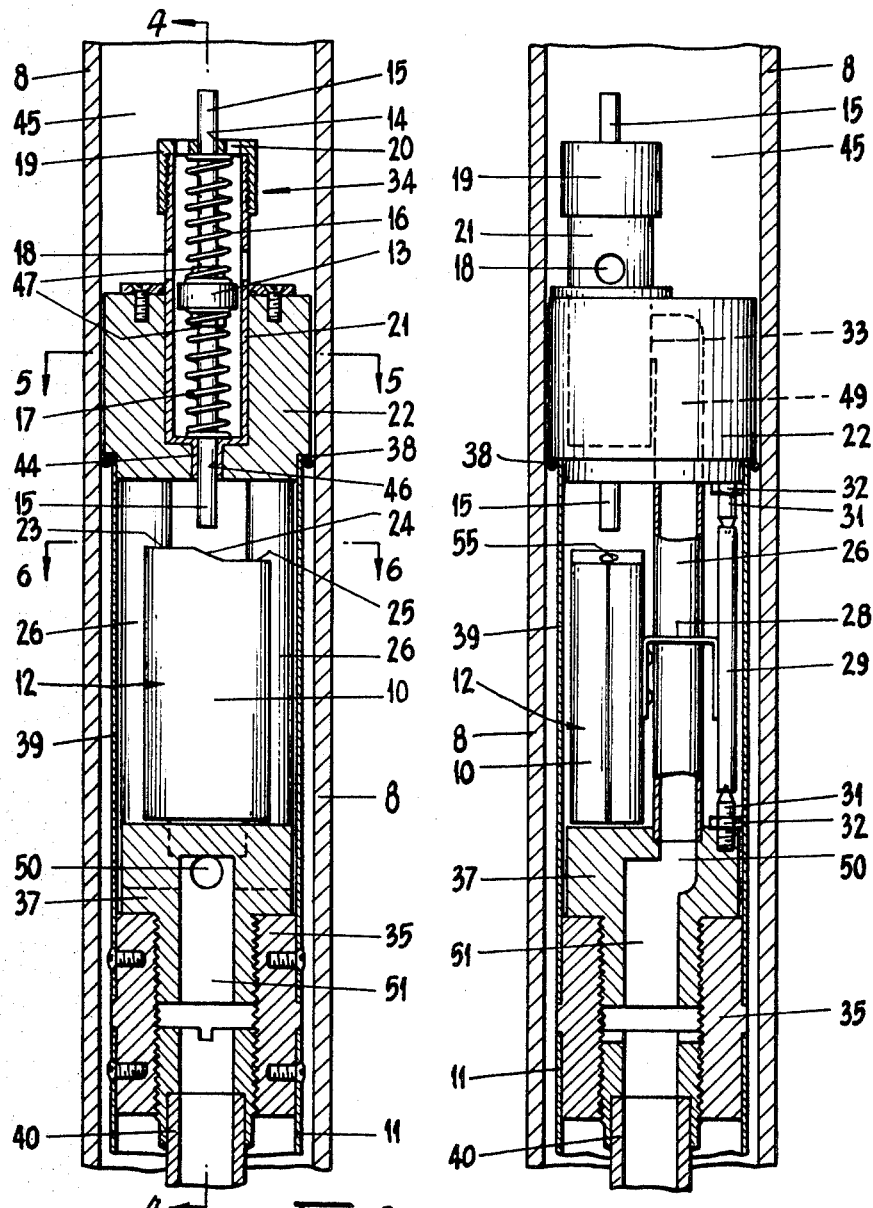
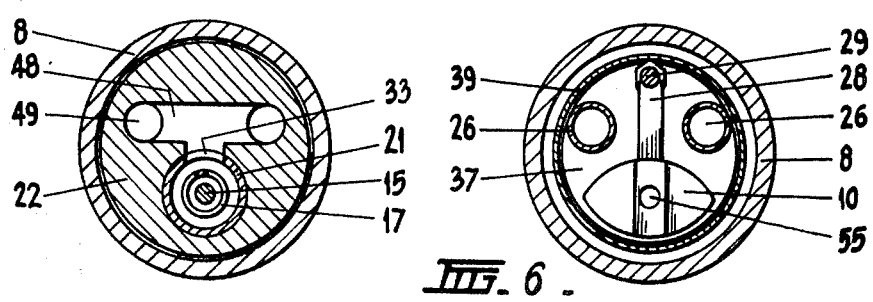

United States Patent Office 3,581,404
Patented June 1, 1971

3,581,404
WEDGE ORIENTATION DEVICE
Ronald Thomas Sanfead, Kalgoorlie, Western Australia, Australia, assignor to Western Mining Corporation Limited, Melbourne, Victoria, Australia
Filed May 6, 1968, Ser. No. 726,750
Int. Cl. E21b *47/02;* G01c *9/00*
U.S. Cl. 33—205                                11 Claims

ABSTRACT OF THE DISCLOSURE

A drill line wedge orientation device having a direction sensitive member and a member movable by pressure in the drill line. The direction sensitive member is so arranged that when the device has a predetermined orientation relative to vertical, the movable member is free to move in response to the pressure in the drill line and result in a changed parameter which can be monitored at the head of the drill line. The changed parameter can be either a drop in pressure or an increase in the fluid flow.

---

This invention relates to an improved wedge orientation device and, particularly, to an orientation device of the type wherein orientation is indicated by a change of hydraulic pressure at the drill head.

This invention is intended to provide a device which can be used without making special provisions for steady pressure and flow of the circulating fluid and also provides a means whereby the wedge device can be set with great efficiency.

The invention includes an orientation device having a direction sensitive member and a member movable by the pressure of fluid in the drill lines, the direction sensitive member being so arranged that when the device is at the required orientation the movable member is free to move under the said pressure, the movement being such as to reduce the pressure in the drill line thus giving a changed parameter which can be metered at the head of the drill line.

The parameter change recorded can be a drop in pressure or it can be an increase in fluid flow through the drill line.

Preferably the direction sensitive member is provided with an aperture or the like therein which aperture is aligned with the movable member only when the orientation device is at the required condition.

In order that the invention may be more readily understood and put into practice, we will describe one embodiment of wedge orientation device made in accordance with the invention and its association with a wedge or the like, the arrangement being shown in the accompanying drawings, in which:

FIG. 3 is a first vertical section through the orientation device;

FIG. 4 is a second vertical section through orientation device along line 4—4 of FIG. 3;

FIG. 5 is a horizontal section along line 5—5 of FIG. 3 through the piston valve assembly; and FIG. 6 is a similar section to that of FIG. 5 along line 6—6 of FIG. 3 through the swinging weight assembly.

Figure 1:
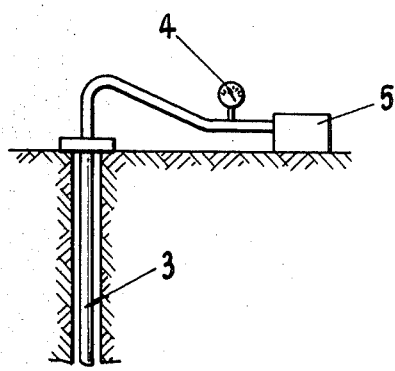
FIG. 1 is a part sectional view of the orientation device positioned in the drill rod train.
Figure 2:
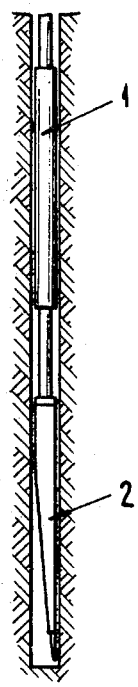
FIG. 2 is a vertical section through the orientation device assembly.
Figure 2:
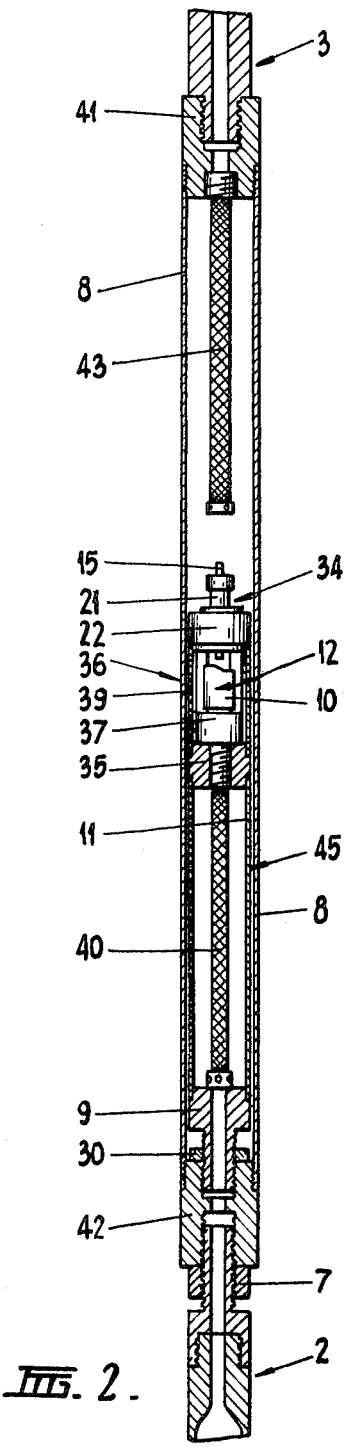

The device includes basically only two main components, a directional sensitive device which will hereinafter be called "the swinging weight assembly" 12 and the member movable under pressure which will hereinafter be referred to as "piston valve assembly" 34.

The device 1 has a body 36 which has a threaded lower end 37 which is screwed into adaptor 35 which is fastened to tubes 11 and 39. The upper end 22 of the device body 36 forms a seal 38 with tube 39 which isolates "the swinging weight assembly" 12 from the drilling fluid in the closed compartment 45. The lower end of tube 11 is fastened to adaptor 9 which is adapted to screw into water end 42 which is able to receive further members such as wedge assembly 2.

The water end 42 is also provided with a threaded outer portion over which can be screwed a standard length of core barrel 8 which forms an outer tube and is a part of the rod line. The upper end of the core barrel is screwed to another water end 41 to which the rod line 3 is screwed.

Rustcatchers 40 and 43 are screwed to water end 41 and adaptor 35 respectively.

Waterends 41 and 42 have axial bores so that the drilling fluid can flow through the rodline 3, waterend 41, rustcatcher 40, device body 36, adaptor 35, rustcatcher 43, adaptor 9 and waterend 42 to the wedge 2 or the like.

The body of the piston valve assembly 34 includes a valve housing tube 21 which extends parallel to the axis of the rod line 3. This valve housing extends through the upper end 22 of the device body 36 into the closed compartment 45.

The valve housing tube 21 has a cap 19 on its upper end and the cap 19 and the lower end of the housing tube 44 are provided with axial apertures 14 and 46 respectively which apertures are adapted to receive a valve spindle 15. A valve member 13 is positioned on the spindle 15 part way along its length and is located by nuts 47. Helical springs 16, 17 are positioned on either side of the valve member 13 and extend outwardly to the cap 19 and the valve housing tube lower end 44 respectively whereby the spndlie 15 normally locates the valve member 13 approximately centrally of the tube 21. Inlet parts 20, 18 are provided in cap 19 and the wall of the tube 21 respectively. A bypass port 33 is provided in the wall of the valve housing tube 21 at a position which is on the downstream side of the valve 13, when the valve is in its standard position. Under normal circumstances there is no passageway from the outer tube 8 through the apertures 18, 20 into the valve housing tube 21 and through the by-pass port 33.

The by-pass port 33 opens into a pair of passages 48 which opens into a port 49 and each of these in turn are connected to a water pass tube 26. The water pass tubes 26 are connected to waterways 50 in the lower end 37 of the body. The waterways 50 combined into a single waterway 51 which opens into the centre of rustcatcher 40.

Such a path can be opened if the pressure on the valve 13 causes it to move to open the by-pass port 33 so there can be fluid flow through the by-pass port, through the water pass tubes, through the waterways of the lower end 37 of the body, through the rust catcher 40 and through the bores of adapter 9 and water end 42.

The swinging weight assembly 12 is located so that the weight 10 is positioned in the path of movement of the valve spindle 15 and the pivotal mounting of the assembly is by a spring shaft 28, which is attached to the weight 10 and a pivot member 29 at its free end. The pivotal axis of the member 29 is parallel to the axis of the outer tube 8 but spaced therefrom.

The particular pivot 29 has both of its ends cupped so that in association with pointed members 31 a bearing assembly is made in which low friction pivoting of the swinging weight is achieved. The members 31 are threaded and screwed into apertures in upper end 22 and lower end 37. In this way the bearing can be adjusted, lock nuts 32 are provided to retain the members 31.

In elevation the swinging weight 10 may have a high side 23 which extends further towards the valve spindle and a low side 25 which is spaced therefrom, the high and low sides being connected by a ramp 24.

In this ramp portion 24 there is provided an aperture 55 which is parallel to the axis of the assembly and which is of diameter such as to enable the valve spindle 15 to be received therein.

In operation rustcatcher 40 is screwed into the lower end adaptor 35, after which orientation device body 36 is screwed into the upper end of adaptor 35 which is permanently attached to tubes 39 and 11. Adaptor 9 which is permanently attached to tube 11 is then screwed into waterend 42 and fixed with locknut 30. The waterend 42 is screwed into the lower end of the barrel 8. Rustcatcher 43 screws into waterend 41 which is screwed into the upper end of barrel 8. The wedge assembly or the like is connected to the lower end of waterend 42 and fixed with locknut 7. The angular position between the wedge assembly or the like and the orientation device is determined on the surface so that the required deflection will be obtained when the orientation device indicated a particular angular orientation of the drill rod train.

The assembly is connected to the drill rod line 3 and lowered down the bore hole to a point about two feet from the bottom. At this stage fluid is pumped by pump 5 down the drill rod train and the pressure of the fluid is measured at the top of the drill hole by a pressure indicating device 4. The pump can be by-passed, the drill train rotated through a predetermined angle and pressure again applied and use steps repeated. There will be one position at which the swinging weight assembly 12 is in direct alignment with the valve spindle 15 and at this position the spindle will be caused to move by the pressure of the fluid in the rod train on the valve 13 so that the spindle enters the aperture 55 in the swinging weight assembly 12 and the by-pass port 33 is uncovered so the fluid can pass through the water pass tubes 26 to the wedge assembly and at the same time the pressure drops because of the fluid movement.

At any angular orientation other than this, movement of the spindle will cause the spindle to contact the swinging weight assembly on one side or the other of the aperture and if the assembly is contacted at its high side 23, the pressure in the drill line will rise to the pressure of the relief valve of the pump.

If the orientation is such that the low side 25 of the swinging weight assembly is in line with the spindle of the valve then there will be a greater permitted movement of the valve spindle 15 which movement will cause partial opening of the by-pass port and thus a pressure drop which is not as great as the drop that would be obtained if the spindle enters the aperture 55 in the swinging weight assembly is obtained.

Thus it can be seen that when the wedge is being oriented the device can be moved through, say, rotations of approximately 10° between the application of pressure to the drill train then through a range of positions, the pressure will be the pressure relief valve of the pump and during a further range of positions the pressure will be slightly lower than this as the spindle rests on the low side 25 of the swinging weight. The position for orientation is between the final reading at the high pressure and the first reading at the lower pressure and the rod assembly can be brought back to this position and the correct orientation position be found by the use of smaller angular movements of the assembly.

The correct position of course being that at which there is the major pressure drop.

If necessary to ensure correct orientation this procedure can be repeated so that a mean position for wedging can be determined.

Once this position has been determined then it is only necessary to move the whole assembly downwardly to strike the floor of the drill hole and commence the wedging operation.

It will, of course, be appreciated that once this is commenced, fluid pressure must be maintained at all times as only by maintaining the valve assembly in the position at which orientation is achieved can a water flow be provided to the wedging device and once such water flow is lost, it is necessary to re-orient the device to obtain water flow.

The chamber containing the swinging weight assembly 12 can be oil filled but this is not essential.

When the device is to be connected to a drill train which is going into a bore hole which is filled with water, the water, when slightly pressurized due to the movement of the train, can readily pass into the centre of the train by acting through the by-pass port 33 onto the underside of the valve 13 and causing sufficient movement of the valve to above ports 18.

The device of the invention is found to give certain advantages not previously being obtained, the first of which is that it can readily be used with circulating water which contains sludge or impurities as the moving parts are such that they will not readily be damaged by such material. Also no special provision need be made for a steady pressure, providing always as previously mentioned the pressure is sufficient to maintain the valve in its located position once the device has been oriented. It is also possible to use the device to check the orientation of the wedge as it is lowered over the last short distance in the bore hole before the shear pins or rivets maintaining the wedge assembly together are sheared. This can be done by repeatedly applying and releasing pressure on the rod line and as long as the applied pressure drops, orientation has been maintained.

The device also has an advantage that it can be made solely of corrosion-proof material which should give it a long working life with minimum maintenance.

In practice there are indications that the device will give satisfactory results in holes as steep as 1° off the vertical and to the present time the steepest orientation at which the device has been used is 88° from the horizontal. The results obtained from this wedging were satisfactory.

In the operating conditions encountered in field use, there is an indication that the liquid flow is approximately four gallons per minute at a pressure of 50 lbs. per square inch when the spindle enters the aperture in the swinging weight assembly whilst when the spindle rests on the high side of the weight assembly, the pressure rises to opproximately 900 lbs. per square inch on the low-side of the weight the pressure is approximately 250 lbs. per square inch, and can be adjusted by relocating valve 13 on the spindle 15. The high pressure is the relief valve pressure of the pump. Thus the differences in pressure are sufficiently great to ensure orientation is recognized when achieved.

It has been found by experiment that the accuracy of the device is within plus or minus 2° which is satisfactory for field use.

The test currently being run have been between four and five thousand feet of depth but there seems to be no indication why effective operation at a greater depth should not be achieved with the device.

What is claimed is:

1. An orientation device for orienting a wedge at the end of a drill line the device having a longitudinal axis substantially coaxial with the axis of the drill line which is normally substantially vertical, comprising a direction sensitive member and a member movable by fluid pressure in the drill line, said direction sensitive member comprising a pivot parallel to the longitudinal axis of the device and a weight spaced from said movable member and mounted on said pivot with its center of gravity so located that it will turn about the pivot upon displacement of the longitudinal axis of the device from vertical, a recess formed in a side of the weight facing said movable member and spaced from said pivot, said direction sensitive member being so arranged that when the device is at a predetermined orientation relative to the vertical, said movable member is free to move under fluid pressure to enter the recess in the weight and to effect a changed parameter which can be monitored.

2. A device according to claim 1 wherein said movable member comprises a two-position valve which in one position prevents fluid flow through the device and in the other position, when the direction sensitive member is at the predetermined orientation, allows fluid flow through the device.

3. A device according to claim 2 wherein said valve comprises a shaft parallel to the longitudinal axis of the device and which is journalled for axial movement, a valve member fixedly mounted part way along said shaft, means biasing the valve to be maintained at said one position when no pressure is applied.

4. A device according to claim 3 wherein said biasing means comprises resilient members acting along said shaft in opposite directions against said valve member.

5. A device according to claim 4 wherein said resilient members are helical springs mounted about said shaft.

6. A device according to claim 1 wherein said side of the weight is profiled, with respect to said movable member, on either side of said recess to define two limited movements of said movable member.

7. A device according to claim 1 further comprising a fluid-tight compartment having said direction sensitive member mounted therein, conduits through said compartment providing for passage of fluid therethrough.

8. A device according to claim 7 wherein said compartment is filled with oil.

9. A device according to claim 1 further comprising means to apply pressurized fluid to said drill line and means to measure a change in a fluid parameter.

10. A device according to claim 9 wherein said means to measure a change in a fluid parameter measures pressure changes.

11. A device according to claim 9 wherein said means to measure a change in a fluid parameter measures fluid flow.

References Cited
UNITED STATES PATENTS

| | | | |
|---|---|---|---|
| 3,077,233 | 2/1963 | Armstrong | 33—205 |
| 2,851,785 | 9/1958 | Gaudin | 33—205 |
| 3,016,621 | 1/1962 | Kielman | 33—205 |
| 2,761,218 | 9/1956 | Bielstein | 33—205 |

LEONARD FORMAN, Primary Examiner

S. L. STEPHAN, Assistant Examiner

U.S. Cl. X.R.

175—45